C. DENN.
Gridiron.
No. 79,056.
Patented June 23, 1868.
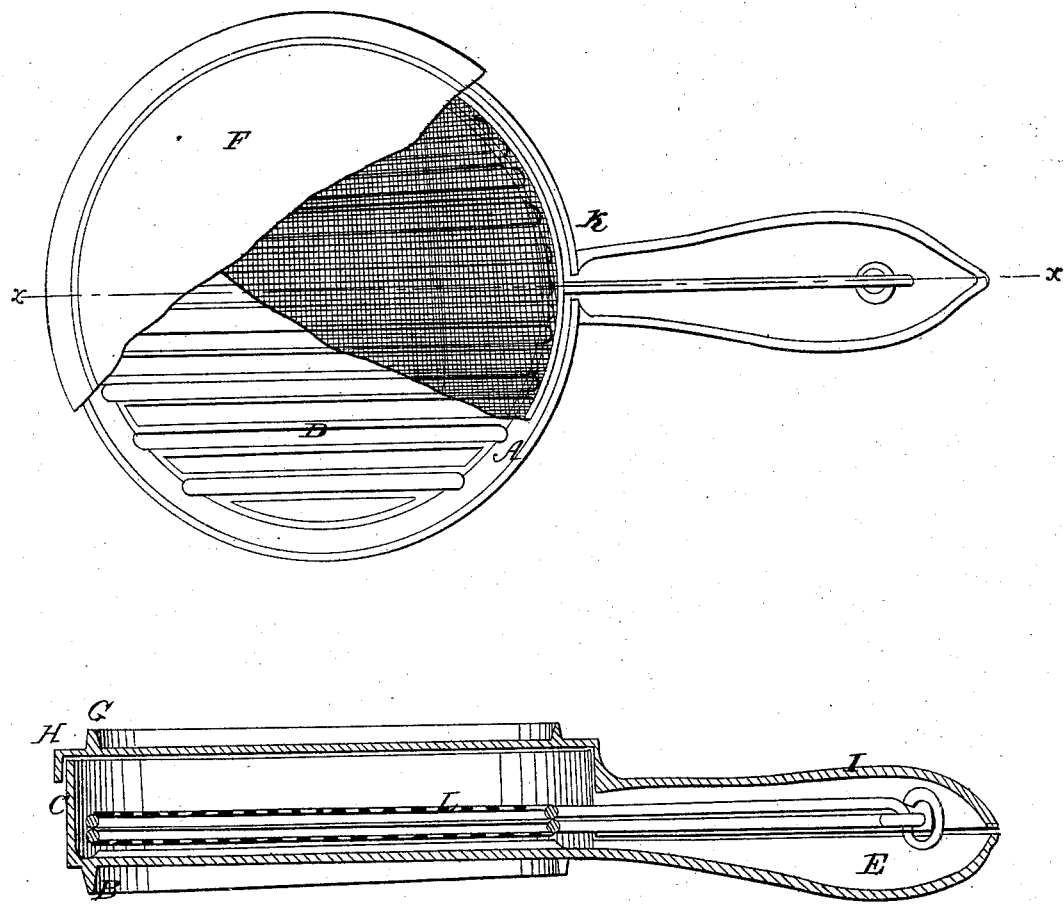

United States Patent Office.

CLAYTON DENN, OF FRANKFORD, PENNSYLVANIA.

Letters Patent No. 79,056, dated June 23, 1868.

IMPROVEMENT IN GRIDIRONS.

*The Schedule referred to in these Letters Patent and making part of the same.*

TO ALL WHOM IT MAY CONCERN:

Be it known that I, CLAYTON DENN, of Frankford, in the county of Philadelphia, and State of Pennsylvania, have invented a new and useful Improvement in Culinary Devices; and I do hereby declare that the following is a full, clear, and exact description thereof, which will enable others skilled in the art to make and use the same, reference being had to the accompanying drawings, forming part of this specification, in which—

Figure 1 represents a plan view of my improved device, with a part of the cover broken away, and Figure 2 represents a section of the same on the line $x\ x$ of fig. 1.

Similar letters of reference indicate like parts.

The nature of my invention relates to improvements in cooking-utensils, the object of which is to provide an improved device for broiling, and which may also be used for other purposes.

It consists of a gridiron, provided with a flange, projecting downward from the bottom, for settling into the stove-hole, also an upward-projecting rim, and a hollow handle, so constructed and inclined with reference to the grates as to admit the gravy to flow therefrom into the handle.

It also consists of a cover, provided for the said gridiron, with a rim to fit over the rim of the latter, a hollow handle, which serves as a cover to that of the gridiron, and a flange, projecting upward from the top, whereby it may be used separately from the gridiron, to serve as a cake-griddle, by turning it bottom side up, and settling the said flange in the stove-hole. An opening is also provided through the rim of the gridiron, in the direction of the handle, whereby a wire gridiron, also having a handle, may be set within the above-described device, when it is desired to cook oysters or other small things, which would fall through the bars or grates.

In the drawings, A represents the gridiron, provided with the flange B, rim C, grooved grates D, and hollow handle E. F represents a cover, provided with the flange G, rim H, and hollow handle I. The rim C, of the part A, is provided with an opening at K.

To use my improved device, the article to be broiled is placed therein, the cover placed thereon, and it is then set in the hole of the stove, the flange B projecting downward in the same, closing the opening of the stove, whereby the draught is preserved, which, in the use of gridirons as commonly constructed, is left open, whereby the live condition of the fire necessary for broiling is soon lost. The smoke is also prevented from escaping, to a great extent, by the cover, into the room.

The part A is made lower in the part toward the handle, whereby the gravy is permitted to flow out through the passage K into the handle, away from the fire, where it is saved for use.

The cover F may also, when not in use as a cover for the gridiron, be used as a cake-griddle, by turning it bottom side up, and placing it over the stove-hole in the usual manner.

When any small article of food, as oysters, are to be broiled, which would be liable to fall through the grate, a wire gridiron, L, may be used, by placing it within the part A, the handle playing in the opening K, and the whole covered by the cover F, whereby all the benefits of my improved device may, with equal facility, be attained, when cooking that kind of food.

Having thus described my invention, I claim as new, and desire to secure by Letters Patent—

1. The gridiron A, constructed substantially as and for the purpose described.

2. The combination, with the gridiron A, of the cover F, substantially as and for the purpose described.

3. The combination of the gridirons A and L, and the cover F, substantially as and for the purpose described.

The above specification of my invention signed by me, this 23d day of April, 1868.

CLAYTON DENN.

Witnesses:
THOMAS SWANN,
THOMAS E. SWANN.